United States Patent [19]
Dircks et al.

[11] Patent Number: 6,061,795
[45] Date of Patent: *May 9, 2000

[54] NETWORK DESKTOP MANAGEMENT SECURITY SYSTEM AND METHOD

[75] Inventors: Charles E. Dircks, Frankfort, Ind.; Eric E. Osmann, Black Forest, Colo.

[73] Assignee: Pinnacle Technology Inc., Kirklin, Ind.

[*] Notice: This patent issued on a continued prosecution application filed under 37 CFR 1.53(d), and is subject to the twenty year patent term provisions of 35 U.S.C. 154(a)(2).

[21] Appl. No.: 08/854,490

[22] Filed: May 12, 1997

Related U.S. Application Data

[63] Continuation-in-part of application No. 08/509,688, Jul. 31, 1995.

[51] Int. Cl.$^7$ .............................. G06F 11/30; H04L 9/00
[52] U.S. Cl. .......................... 713/201; 709/217; 714/38
[58] Field of Search .................. 395/200.33, 200.47, 395/200.46, 200.49, 200.55, 200.59; 713/201, 200, 202; 714/38; 709/216, 217, 219, 203, 225, 229; 380/3, 4, 23, 25

[56] References Cited

U.S. PATENT DOCUMENTS

| 5,023,907 | 6/1991 | Johnson | 380/4 |
| 5,297,032 | 3/1994 | Trojan | 364/408 |
| 5,315,657 | 5/1994 | Abadi et al. | 380/25 |
| 5,349,643 | 9/1994 | Cox | 380/25 |
| 5,369,778 | 11/1994 | San Soucie | 395/800 |

(List continued on next page.)

FOREIGN PATENT DOCUMENTS

| 0 442 839 A2 | 8/1991 | European Pat. Off. |
| 0 561 509 A1 | 9/1993 | European Pat. Off. |
| WO 97/15008 | 4/1997 | WIPO |

OTHER PUBLICATIONS

International Search Report Corresponding to PCT/US97/08065.

"Administration of Graphic User Interface and Multimedia Objects Using Cooperative Processing", IBM Technical Disclosure Bulletin, vol. 37, No. 9, Sep. 1, 1994, pp. 675–678.

(List continued on next page.)

*Primary Examiner*—Dieu-Minh T. Le
*Attorney, Agent, or Firm*—Baker & Daniels

[57] ABSTRACT

The present invention involves a desktop administration system and method which allows a network administrator to remotely create, protect, and manage desktops and control file systems across a network. The invention provides a graphic user interface to construct user desktops, apply restriction options, maintain transaction logs, and password protect any object accessible from the user workstation. The server software operates to lock out any unpermitted users, allowing access to programs or processes presenting appropriate keys or other authentication information. Each workstation includes a personal desktop facility (PDF) and a Daemon which protects the user's desktop. The PDF receives desktop information from the network server and builds a desktop which the user manipulates to invoke local and/or network programs and access local and/or network utilities, providing appropriate keys or other authentication information to access restricted network resources. The Daemon serves as an interface for the PDF by channeling any communication to or from the user or the networkpreventing unauthorized transactions at either the workstation or network level. The PDF provides a graphic user interface using objects that encapsulate programs with data, such as user preferences, default directories, and access privileges. The Daemon performs many tasks, including starting the PDF, enumerating the windows of the graphic user interface, and recording operations.

38 Claims, 2 Drawing Sheets

Microfiche Appendix Included
(17 Microfiche, 1070 Pages)

U.S. PATENT DOCUMENTS

| | | | |
|---|---|---|---|
| 5,375,224 | 12/1994 | McNair | 395/725 |
| 5,379,432 | 1/1995 | Orton | 395/700 |
| 5,381,534 | 1/1995 | Shi | 395/200 |
| 5,455,953 | 10/1995 | Russell | 395/739 |
| 5,469,556 | 11/1995 | Clifton | 395/490 |
| 5,475,625 | 12/1995 | Glaschick | 395/600 |
| 5,481,715 | 1/1996 | Hamilton | 395/700 |
| 5,553,239 | 9/1996 | Heath | 395/187.01 |
| 5,604,490 | 2/1997 | Blakley, III et al. | 340/825.31 |
| 5,644,768 | 7/1997 | Periwal et al. | 709/102 |
| 5,678,041 | 10/1997 | Baker et al. | 395/609 |
| 5,696,898 | 12/1997 | Baker et al. | 395/187.01 |
| 5,774,650 | 6/1998 | Chapman et al. | 395/186 |

OTHER PUBLICATIONS

Cripe, B.E., et al.: A Common Desktop Environment for Platforms Based on the Unix Operating System, Hewlett–Packard Journal, vol. 47, No. 2, Apr. 1, 1996, pp. 6–14.

"Graphical Operations", IBM Disclosure Bulletin, vol. 38, No. 5, May 1, 1995, pp. 591–593.

NETWORK DESKTOP MANAGEMENT SECURITY SYSTEM AND METHOD

CROSS-REFERENCE TO RELATED APPLICATIONS

The present application is a continuation-in-part of U.S. patent application Ser. No. 08/509,688, filed Jul. 31, 1995.

MICROFICHE APPENDIX

This application includes by reference the microfiche appendix of U.S. patent application Ser. No. 08/509,688, having 722 frames. This application also includes a microfiche appendix having 1070 frames and 17 sheets. A portion of the disclosure of this patent document contains material which is the subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates to network administration software. More specifically, the field of the invention is that of network administration software for managing user workstations on a network.

2. Description of the Related Art

Computer networks are arranged so that a multitude of users can access common network resources. Each user has a workstation, typically a stand alone personal computer which is connected through a suitable communications link to the other computers of the network. The network administrator is a program which runs on the network server or an administrator workstation which coordinates and manages the access and security of the users on the network. The management of users involves allocating and facilitating access to resources such as programs and data files which are needed or desired by particular users. The security provisions involve allowing only the appropriate users access to certain programs and data files to maintain the integrity and privacy of the network system.

Desktop administration programs provide each user with an individual view of the user's workstation configuration, the network, and the resources available over the network. Such programs conventionally provide a graphic user interface and operate under several constraints. One constraint involves the transparency of the desktop administration program. Transparency in this context means the ability of a user to ascertain the presence of the program merely from observing the operation of the user's workstation. Ideally, a user should not be able to detect the presence of the desktop administration program. Another constraint involves the underlying operating system of the workstation computer and the network. Ideally, the desktop administration program should not interfere with the operation of any portion of the underlying operating system. The management of individual user preferences also constrains desktop administration programs. Ideally, the user's modifications of a desktop configuration should not corrupt the desktop administration program's management of user desktops. Known desktop replacement or administration programs have difficulties in one or more of these constraints.

What is needed is a desktop administration program which alleviates the above identified constraints and works in concert with the operating system and its standard graphic user interface.

SUMMARY OF THE INVENTION

The present invention is a desktop administration system and method which allows a network administrator to remotely create, protect, and manage desktops across a network. The invention provides a graphic user interface to construct user desktops, apply restriction options, maintain transaction logs, and password protect any object accessible from the user workstation. The invention allows these functions without altering how a user works on the desktop, or the capacities of the underlying operating system or network.

Each workstation includes a personal desktop facility (PDF) and a Daemon which protects the user's desktop. The personal desktop facility receives desktop information from the network server and builds a desktop which the user manipulates to invoke local and/or network programs and access local and/or network utilities. The Daemon serves as an interface for the personal desktop facility by channeling any communication to or from the user or the network, preventing unauthorized transactions at either the workstation or network level.

The personal desktop facility (PDF) provides a graphic user interface using objects that represent collections of programs and data, such as user preferences, default directories, and access privileges. The PDF can create objects, remove objects, and alter object settings. Providing a user with the proper collection of objects with the proper settings creates a workstation tailored to the users needs, thus increasing the efficiency of the user.

The daemon has many tasks, including starting the PDF, enumerating the windows of the graphic user interface, and recording operations. Starting the PDF may involve obtaining security clearance, and includes loading the user's desktop from the server. Enumerating the windows of the graphic user interface facilitates proper operation of the desktop and the programs running under it. Recording operations may involve creating a log of user operations, such as tagging or signaling events when they occur, noting the usage of passwords, and the startup and exit of the desktop from the network connection.

The present invention provides several significant advantages. The network administrator may standardize desktops quickly and uniformly by manipulating the server's database of personal desktop profiles, or by modifying common desktop objects which are stored on the server. Users may also be mobile across the network, because regardless of which machine they use, the PDF will load their personal desktop file from the network server. The Daemon further protects the desktop from inadvertent damage, and prevents intentional alteration of the network architecture.

The present invention, in one form, relates to a computer network for providing user access to resources including at least one of local and network computer programs, local and network peripheral devices, and external communication devices, the network comprising a server, a plurality of workstations coupled to the server, each workstation including display a graphic user interface for a user, and a communications device for transmitting messages between the server and the workstations. The server provides access to at least one resource for a user who operates one of the workstations, with the server including a plurality of information records each with a user specific workstation configuration including specification of accessible resources for the user. The workstation includes a desktop facility for creating and displaying items referencing resources on a display means of the workstation, the desktop facility capable of retrieving one of the information records from said server, said desktop means further including means for preventing a user from accessing any resources not specified by said retrieved information record.

The present invention, in another form, is a method for a network of computers including a server and a workstation. The method provides users access to resources and comprises the steps of creating a plurality of information records each with a user specific workstation configuration including specification of accessible resources for the user; retrieving one of the user specific information records using a computer program operating on the workstation; and providing on the workstation a desktop user interface providing user access as specified by the information record associated with the user.

The inventional method may also include the step of blocking access to resources via a security kernel, wherein the information records include a key for only allowing access to resources via the security kernel. The method may further include the step of allowing access to resources upon receipt of a corresponding key from the desktop user interface.

Other aspects of the invention relate to the step of monitoring processes initiated by the desktop user interface, wherein the monitoring step includes the step of checking processes on the workstation against the user specific information record received from the server. Also, the inventional method prevents unauthorized access to the network resources through the desktop, and may impose access restrictions based on information stored on the workstation or require that a user have access to a validation resource before allowing access to a specified resource. In another aspect of the invention, the network uses an object oriented operating system, and each object includes a plurality of instructions and associated data so that the system creates a list of objects representing the resources. The desktop may be stored after a session with a user, or filtered according to criteria received from the server.

Another aspect of the invention relates to a machine-readable program storage device for storing encoded instructions for a method of providing user access to resources in a network of computers including a server and a workstation according to the foregoing method.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
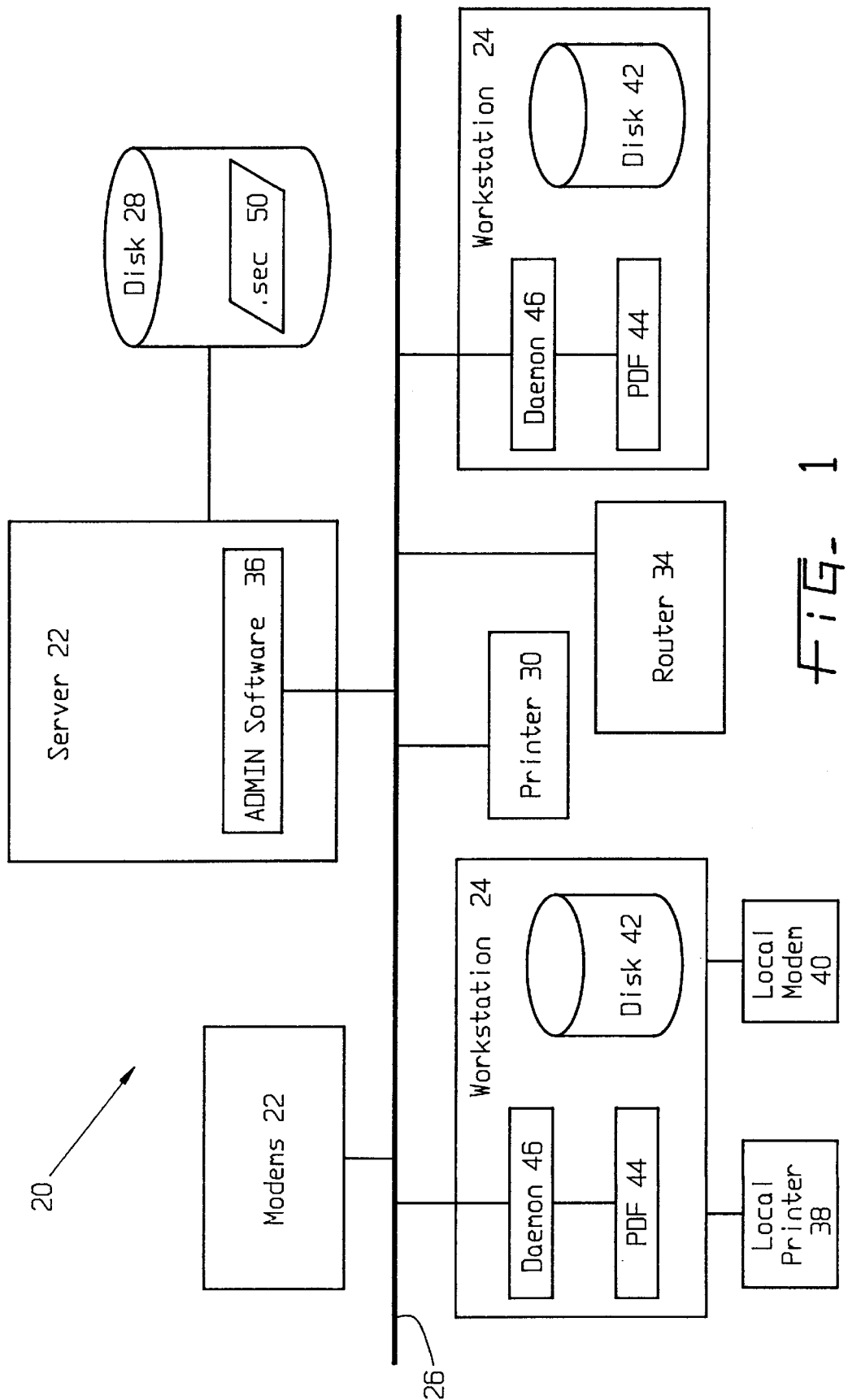
FIG. 1 is a schematic diagrammatic view of a computer network using the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF THE PRESENT INVENTION

The embodiment disclosed below is not intended to be exhaustive or limit the invention to the precise form disclosed in the following detailed description. Rather, the embodiment is chosen and described so that others skilled in the art may utilize its teachings.

The detailed descriptions which follow are presented in part in terms of algorithms and symbolic representations of operations on data bits within a computer memory representing alphanumeric characters or other information. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, symbols, characters, display data, terms, numbers, or the like. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart a physical organization on the information stored in memory. More than mere abstraction, the data structures are specific electrical or magnetic structural elements in memory which simultaneously represent complex data accurately and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. The present invention relates to a method and apparatus for operating a computer in processing electrical or other (e.g., mechanical, chemical) physical signals to generate other desired physical signals.

The present invention also relates to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

The present invention deals with "object-oriented" software, and particularly with an "object-oriented" operating system. The "object-oriented" software is organized into "objects", each comprising a block of computer instructions describing various procedures ("methods") to be performed in response to "messages" sent to the object. Such operations include, for example, the manipulation of variables and the transmission of one or more messages to other objects. Messages are sent and received between objects having certain functions and knowledge to carry out processes. Messages are generated in response to user instructions, for example, by a user activating an icon with a "mouse" pointer. Also, messages may be generated by an object in response to the receipt of a message. When one of the objects receives a message, the object carries out an operation (a message procedure) corresponding to the message and, if necessary, returns a result of the operation. Each object has a region where internal states (instance variables) of the object itself are stored and where the other objects are not allowed to access. One feature of the object-oriented system is inheritance. For example, an object for drawing a "circle" on a display may inherit functions and knowledge from another object for drawing a "shape" on a display.

A programmer "programs" in an object-oriented programming language by writing individual blocks of code each of which creates an object by defining its methods. A collection of such objects adapted to communicate with one another by means of messages comprises an object-oriented program. Object-oriented computer programming facilitates the modeling of interactive systems in that each component of the system can be modeled with an object, the behavior of each component being simulated by the methods of its corresponding object, and the interactions between components being simulated by messages transmitted between objects.

An operator may stimulate a collection of interrelated objects comprising an object-oriented program by sending a message to one of the objects. The receipt of the message may cause the object to respond by carrying out predetermined functions which may include sending additional messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object-oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object-oriented programming makes simulation of systems of interrelated components more intuitive, the operation of an object-oriented program is often difficult to understand because the sequence of operations carried out by an object-oriented program is usually not immediately apparent from a software listing as in the case for sequentially organized programs. Nor is it easy to determine how an object-oriented program works through observation of the readily apparent manifestations of its operation. Most of the operations carried out by a computer in response to a program are "invisible" to an observer since only a relatively few steps in a program typically produce an observable computer output.

In the following description, several terms which are used frequently have specialized meanings in the present context. The term "object" relates to a set of computer instructions and associated data which can be activated directly or indirectly by the user. The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations", provide a user interface so that users of computer networks can access the network resources, such as shared data files, common peripheral devices, and inter-workstation communication. Users activate computer programs or network resources to create "processes" which include both the general operation of the computer program along with specific operating characteristics determined by input variables and its environment.

The terms "desktop", "personal desktop facility", and "PDF" mean a specific user interface which presents a menu or display of objects with associated settings for the user associated with the desktop, personal desktop facility, or PDF. The term "Daemon" refers to a program which is not necessarily apparent to the user, but which is responsible for transmitting messages between the PDF and the network server and for protecting and regulating the user's ability to use and modify network resources. Although the following description details such operations in terms of a graphic user interface using icons, the present invention may be practiced with text based interfaces, or even with voice or visually activated interfaces.

A computer network is shown in block diagram form in FIG. 1, showing the general orientation and arrangement of the software operating on the computer equipment, including the server administration, the workstation PDF, and the Daemon software. Network 20 includes at least one server 22 and at least one, and typically dozens or hundreds, of workstations 24. Server 22 and workstations 24 are connected by communication line 26 which may be an ethernet cable or another suitable device. Network 20 also includes several shared peripheral devices, such as disk storage 28 (typically coupled directly to server 22, although connection through communication line 26 is also possible), printers 30, modems 32, and router 34. ADMIN (administration) software 36 resides on server 22, and generally controls communications between the components of network 20. For example, ADMIN software 34 typically controls access to disk storage 28, the scheduling of printing jobs on printers 30, the allocation of modems 32, and the transmission of information through router 34.

Each workstation 24 includes a computer with a monitor and keyboard, such as a standard personal computer (e.g., an IBM-PC type or Macintosh) or an advanced computer (e.g., a Next or SPARC workstation), and may include its own peripheral devices such as local printer 38, local modem 40, or local disk storage 42. With the present invention, each workstation 24 includes PDF 44 and Daemon 46. PDF 44 provides a graphic user interface, or "desktop", to the programs and resources available on its workstation 24 and generally through network 20. Daemon 46 serves as an intermediary between ADMIN 36 and PDF 44, filtering out unauthorized activities and maintaining the integrity of the desktop. ADMIN 36 only accepts requests and receives messages from Daemon 46, so PDF 44 is required to access information and programs through Daemon 46, and must send all of its information to ADMIN 36 through Daemon 46. Further, PDF 44 may only change the parameters of the desktop through Daemon 46, and Daemon 46 determines what operations are permissible based on criteria supplied from ADMIN 36. Daemon 46 includes both an initiation routine (contained in the source code file KP2WPS.C of the parent application) and a periodic checking routine (contained in the source code file KP2SHUF.C of the parent application) to implement these functions. With this arrangement, which is explained in further detail below and in the source code appendix, the integrity of each desktop is maintained by Daemon 46, and permanently maintained by ADMIN 36.

In accordance with the present invention, disk 28 of server 22 stores .sec file 50 (the logical designation of .sec file 50 may include several separate physical files which are interrelated through logical connections). ADMIN software 36 uses the information contained in .sec file 50 to specify the menu of computer programs and network resources which may be referenced by the desktops of the users of network 20. .sec file 50 may be a general file for all the users of network 20. Alternatively, .sec file 50 may represent a collection of files, which each file corresponding to a particular user or a particular class of user. Another alternative is a hybrid approach, wherein the menu information has a common component and a user specific component. In any event, this arrangement allows for a network administrator to directly manipulate .sec file 50 with ADMIN software 36 on server 22 to modify, customize, and/or maintain the desktops across a network, rather than having to change each desktop configuration locally.

In addition to ADMIN 36 creating .sec file 50 to record a user's desktop configuration on server 22, the present invention uses PDF 44 to enforce the user's desktop configuration directly on workstation 24. PDF 44 operates on the assumption that unless the user is specifically authorized to access a particular computer program or resource, that user's workstation should not be allowed to manipulate or interact with that particular item. Only upon receiving .sec file 50 from ADMIN 36 does PDF 44 construct a desktop for the user, and that desktop only provides access to computer programs and resources which are specifically identified for the user on .sec file 50. Thus, with the first embodiment of the present invention (disclosed in the source code appendix of parent patent application Ser. No. 08/509,688), access control is first maintained at the level of workstations 24 to enhance the protection of server 22.

In a second embodiment of the invention (disclosed in the source code appendix of the present invention), ADMIN 36 on server 22 locks out the user from the file system software at workstation 24, and only a properly configured desktop provided by PDF 44 can present a key to unlock the file system and access resources on server 22. The implementation of the second embodiment with the OS/2 operating system includes several routines of ADMIN 36 which interact with certain security features of the OS/2 operating system to achieve this file lock out. However, one of ordinary skill in this art would readily appreciate that such server access control lock-outs may be implemented with any operating system by a suitably designed program operating with the benefit of system administration privileges.

The present invention may be best explained using the paradigm of an object oriented operating system. However, one of ordinary skill in the operating system programming art recognizes that all operating systems may be abstracted to conform with object oriented programming principles so that a programmer may impose object oriented programming principles on any operating system. The exemplary embodiment of the present invention works in conjunction with the OS/2* operating system developed and sold by International Business Machines, Incorporated (IBM) (*"OS/2" is a trademark of IBM). The OS/2 operating system formally identifies and utilizes objects as part of its operating schema, wherein the individual processes managed by the OS/2 operating system are encapsulated by objects which define the computer programs, data, icons, access privileges, and other attributes effecting the ability of the process to influence or alter other portions of the system. Many similar operating systems use an object oriented operating schema, and thus the present invention is directly applicable to many conventional operating systems, including Windows95 and WindowsNT made by Microsoft Corporation.

In an object oriented operating system, programs and the processes they create may be associated with a class which has common characteristics. The class designation communicates to the operating system that the class member includes a predefined set of characteristics. Access privileges and security clearances may be set for classes rather than having to identify such information for every individual object or process. Also, PDF 44 and ADMIN 36 may be designed to include security and control algorithms which can target classes of processes rather than only singly identified processes. The following example of a .sec file used in the second embodiment of the invention as a default desktop profile, implemented in this embodiment as a flat text file, provides several class designations along with the other desktop information.

[Master] ENABLESECURITY=OBJECTS;RESTRICTUNDEF=YES;DESC=Default Workstation
Desktop;PASSWORD=æSéuoJöEÿcÉ▓ö[a|├ ┤|şiÂ[u▲GÜ§▼Σ≈◊◘;LOG=BCD;
[Folder] TITLE=Desktop; CLASS=DskDesktop; OBJECTID=<WP_DESKTOP>;
ICONRESOURCE=56,PMWP.DLL; DEFAULTVIEW=OPEN_DEFAULT; POPUP=6258802;
HELPPANEL=4000; MINWIN=VIEWER; NOCOPY=YES; NODELETE=YES; NOPRINT=YES;
BYPSSETUP=YES; WINLIST=YES; INCCHLD=YES; BACKGROUND=
C:\OS2\BITMAP\BUBBLPAD.BMP, T, 0, I, 163 163 148; ICONFONT=8.Helv;
ICONVIEW=NOGRID,NORMAL; TREEFONT=8.Helv; TREEVIEW=MINI,LINES;
DETAILSFONT=8.Helv;
[Folder] TITLE=OS/2 System; CLASS=PRDirectory; OBJECTID=<DO_OS2SYS>;
PARENTID=<WP_DESKTOP> ;SHADOWID=<WP_OS2SYS>; ICONPOS=8, 80;
DEFAULTVIEW=184, 345, 716, 291; HELPPANEL=4002; MINWIN=VIEWER; NOCOPY=YES;
NODELETE=YES; NODRAG=YES; NODROP=YES; NOMOVE=YES; NORENAME=YES;

-continued

```
NOLINK=YES; NOSETTINGS=YES; NOPRINT=YES; WINLIST=YES;
BACKGROUND=(none),,,C,255 255 236; ICONFONT=8.Helv; ICONVIEW=FLOWED,MINI;
TREEFONT=8.Helv; TREEVIEW=MINI,LINES; DETAILSFONT=8.Helv;
[Folder]TITLE=Connections; CLASS=PRDirectory;
OBJECTID=<DO_CONNECTIONSFOLDER>; PARENTID=<WP_DESKTOP>;
SHADOWID=<WP_CONNECTIONSFOLDER>; ICONPOS=8,62;
DEFAULTVIEW=OPEN_DEFAULT; HELPPANEL=1277; MINWIN=VIEWER; NOPRINT=YES;
WINLIST=YES; BACKGROUND=(none), , , C, 255 255 236; ICONFONT=8.Helv;
ICONVIEW=NOGRID, NORMAL; TREEFONT=8.Helv; TREEVIEW=MINI,LINES;
DETAILSFONT=8.Helv;
[Folder] TITLE=Assistance Center; CLASS=PRDirectory; OBJECTID=<DO_ASSISTANCE>;
PARENTID=<WP_DESKTOP>; SHADOWID=<WP_ASSISTANCE>; ICONPOS=8,71;
DEFAULTVIEW=OPEN_DEFAULT; HELPPANEL=1277; MINWIN=VIEWER; NOPRTNT=YES;
WINLIST=YES; BACKGROUND=(none),,,C,255 255 236; ICONFONT=8.Helv;
ICONVIEW=FLOWED,MINI; TREEFONT=8.Helv; TREEVIEW=MINI,LINES;
DETAILSFONT=8.Helv;
[Folder] TITLE=Programs; CLASS=PRDirectory; OBJECTID=<DO_PROGRAMSFOLDER>;
PARENTID=<WP_DESKTOP>; SHADOWID=<WP_PROGRAMSFOLDER>; ICONPOS=8,53;
DEFAULTVIEW=OPEN_DEFAULT; HELPPANEL=1277; MINWIN=VIEWER; NOPRINT=YES;
WINLIST=YES; BACKGROUND=(none),,,C,255 255 236; ICONFONT=8.Arial;
ICONVIEW=FLOWED,MINI; TREEFONT=8.Arial; TREEVIEW=MINI,LINES;
DETAILSFONT=8.Arial;
[Folder] TITLE=WebExplorer; CLASS=PRDirectory; OBJECTID=<DO_WC_WEBEX_FOLD0>;
PARENTID=<WP_DESKTOP>; SHADOWID=<WC_WEBEX_FOLD>; ICONPOS=8,44;
DEFAULTVIEW=OPEN_DEFAULT; HELPPANEL=1277; MINWIN=VIEWER; NOPRINT=YES;
WINLIST=YES; BACKGROUND=(none),,,C,255 255 236; ICONFONT=9.WarpSans;
ICONVIEW=NOGRID,NORMAL; TREEFONT=9.WarpSans; TREEVIEW=MINI,LINES;
DETAILSFONT=9.WarpSans;
[Object] TITLE=Shredder; CLASS=WPShredder; OBJECTID=<DO_SHRED>;
PARENTID=<WP_DESKTOP>; SHADOWID=<WP_SHRED>; ICONPOS=88,32;
ICONRESOURCE=28,PMWP.DLL; DEFAULTVIEW=OPEN_DEFAULT; HELPPANEL=1190;
MINWIN=VIEWER; NOCOPY=YES; NODELETE=YES; NOPRINT=YES; WINLIST=YES;
[Object] TITLE=Templates; CLASS=DskShadow;
OBJECTID=<DO_Templates0DskShadowDskDesktop>; PARENTID=<WP_DESKTOP>;
SHADOWID=<WP_TEMPS>; ICONPOS=8,34; DEFAULTVIEW=OPEN_DEFAULT;
HELPPANEL=15680; MINWIN=VIEWER; NOPRINT=YES; WINLIST=YES;
[Object] TITLE=Black Hole; CLASS=BlackHole; OBJECTID=<DO_BLACKHOLE0>;
PARENTID=<WP_DESKTOP>; SHADOWID=<BLACKHOLE>; ICONPOS=80,32;
ICONRESOURCE=22,PMWP.DLL; DEFAULTVIEW=OPEN_DEFAULT; MINWIN=VIEWER;
NOPRINT=YES; WINLIST=YES;
[Pad] TITLE=LaunchPad; CLASS=WPLaunchPad; OBJECTID=<DO_LAUNCHPAD>;
PARENTID=<WP_DESKTOP>; ICONPOS=79,87; ICONRESOURCE=74,PMWP.DLL;
DEFAULTVIEW=OPEN_DEFAULT; HELPPANEL=32253; CCVIEW=NO; MINWIN=VIEWER;
NOPRINT=YES; WINLIST=YES; FPOBJECTS=<WPPO_IBMLASER>, <WP_DRIVE_A>,
<WP_OS2WIN>, <WP_ASSISTANCE>, <WP_SHRED>; LPACTIONSTYLE=TEXT;
LPHIDECTLS=YES;
DRAWEROBJECTS=3,<WP_WIN2WIN>,<WP_DOSWIN>^;2,<WP_DRIVES>;
[Program] TITLE=Verify^r^nDefects; CLASS=WPProgram;
OBJECTID=<DO_Verify_Defects0WPProgramDskDesktop>; PARENTID=<WP_DESKTOP>;
SHADOWID=<DU_Verify_Defects0WPProgramDskDesktop>; ICONPOS=88,67;
DEFAULTVIEW=OPEN_DEFAULT; HELPPANEL=4083; CCVIEW=NO; MINWIN=VIEWER;
NOPRINT=YES; USEPARENT=YES; WINLIST=YES; EXENAME=D:\TOOLS\VERDFCT.CMD;
PROGTYPE=WINDOWABLEVIO;
[Program] TITLE=SkyScraper; CLASS=WPProgram;
OBJECTID=<DO_SkyScraper0WPProgramDskDesktop>; PARENTID=<WP_DESKTOP>;
SHADOWID=<DU_SkyScraper0WPProgramDskDesktop>; ICONPOS=9,90;
DEFAULTVIEW=OPEN_DEFAULT; HELPPANEL=4083; CCVIEW=NO; MINWIN=DESKTOP;
NOPRINT=YES; LNCHPROG=C:\OS2\E.EXE; EXITPROG=C:\OS2\ICONEDIT.EXE;
EVENTEXIT=YES; EVENTLNCH=YES; GLBLPW=YES;
EXENAME=C:\SKY\SKY.EXE;PARAMETERS=/ao /r1 /d2 /j1 /g2 /ml /x2;
STARTUPDIR=C:\SKY;PROGTYPE=PM;
[Program] TITLE=Rejected^r^nDefects;
CLASS=WPProgram;OBJECTID=<DO_Rejected_Defects0WPProgramDskDesktop>;
PARENTID=<WP_DESKTOP>; SHADOWID=<DU_Rejected_Defects0WPProgramDskDesktop>;
ICONPOS=89,45; DEFAULTVIEW=OPEN_DEFAULT; HELPPANEL=4083;
MINWIN=VIEWER; NOPRINT=YES; WINLIST=YES; EXENAME=D:\TOOLS\REJECT.CMD;
PROGTYPE=WINDOWABLEVIO;
[Datafile] TITLE=config.sys; CLASS=WPDataFile; OBJECTID=<DO_C_config_sys0>;
PARENTID=<WP_DESKTOP>; SHADOWID=C:\config.sys;
DEFAULTVIEW=OPEN_DEFAULT; NVBLDORIG=YES; VPF=C:\DSKOBV;
HELPPANEL=4082; CVIEW=YES; HIDEBUTTON=YES; MINWIN=DESKTOP;
WINLIST=YES; LOG=ABCD;
[Object] TITLE=Drive D;CLASS=PRDisk; OBJECTID=<DO_DRIVE_D>;
PARENTID=<WP_DESKTOP>; SHADOWID=<WP_DRIVE_D>;
ICONRESOURCE=13,PMWP.DLL; DEFAULTVIEW=120; HELPPANEL=8015;
MINWIN=VIEWER; NOCOPY=YES; NODELETE=YES; NOMOVE=YES; NOPRINT=YES;
WINLIST=YES;
[Printer] TITLE=IBM Laser - Optra E; CLASS=WPRPrinter;
OBJECTID=<DO_WPPO_IBMLASER0>; PARENTID=<WP DESKTOP>
```

-continued

```
;SHADOWID=<WPPO_IBMLASER>; DEFAULTVIEW=OPEN_CONTENTS;
HELPPANEL=15409; CCVIEW=NO; MINWIN=VIEWER ;NOPRINT=YES; WINLIST=YES;
NETID=LS:\\*COLORADO\LASER ;ALIAS=IBMLASER; SHOWJOBS=ALL;REFRESH=25;
[Program] TITLE=Sample Program; CLASS=WPProgram; OBJECTID=<DO_SAMPLEPROG>;
PARENTID=<WP_DESKTOP>; DEFAULTVIEW=OPEN_DEFAULT; CCVIEW=YES;
HIDEBUTTON=YES; MINWIN=HIDE; NOTVISIBLE=YES; NOMOVE=YES;
NORENAME=YES; NOSETTINGS=YES; TEMPLATE=YES; WINLIST=YES;
EXENAME=C:\OS2\ATTRIB.EXE; PARAMETERS=+r [Enter file to write-protect];
PROGTYPE=PM;
[Ses] TRUSTEDAPP=c:\os2\e.exe;RUNWARN=1;LOG=AD;
[Ses] FILE=autoexec.bat;DIR=c:;LOCK=FILE;RUNWARN=0;FILEATTR=RWDM;LOG=aceg;
[Ses] DIR=c:\os2; LOCK=DIR; SUBDIR=YES; RUNWARN=0; FILEATTR=WDM;
DIRATTR=CGDM; LOG=cegkmo;
[Ses] FILE=protocol.ini; DIR=c:\ibmlan; UNLOCK=FILE; OCCUR=ALL; RUNWARN=0;
FILEATTR=RWDM;
[Device] PORTS=COM1,COM2,COM3,COM4,LPT1; LOG=ABCD;
[Filter] TEXT=WarpCenter; BEGMTCH=YES; NOCLSWPS=YES;
[Filter] TEXT=System; PASSWORD=æ=éτö ö [yiÉcôSàs⫲Γ<⫤iô&⫤▌ "▒▼Σ=◇◘;
MIDMTCH=YES; WINLIST=YES; IGNCASE=YES; LOG=ABCD;
[End]
```

Each initial bracketed item identifies the class of the object, including desktop objects, devices, filters, or file system objects, which is utilized by PDF 44 to invoke the appropriate program, install the appropriate desktop icon, or initialize the appropriate resource. The first item, [Master], is a header block identifying the .sec file, in this instance a Master file for a default workstation desktop. The statement ENABLESECURITY=OBJECTS instructs PDF 44 to use security privileges on an object level ("FS" would instruct PDF 44 to use file system security privileges, while "BOTH" would enable both object and file system security), while the statement RESTRICTUNDEF=YES instructs PDF 44 to check for, and if an undefined process is found, restrict its access to workstation 24 and server 22. The PASSWORD statement identifies the default security password, which is encrypted, and the statement LOG=BCD activates a transaction log in the background of the desktop operation. These and other high level instructions can thus be provided to PDF 44 on the workstation from the .sec file provided by ADMIN 36. ADMIN 36 can then block all access to network resources by the workstation until supplied the appropriate information (e.g., keys, predefined requests, or passwords) from PDF 44.

The second item of the .sec file of the example, [Folder] TITLE=Desktop, is the highest level class and identifies the desktop user interface representation of the object. The statement CLASS=DskDesktop indicates that the object belongs to the class of top level desktop display which is created by inheriting characteristics from the WPShell class and adds further characteristics utilized by the inventional method (the DskDesktop class is sometimes referred to as a replacement class as it replaces the WPShell class). This desktop class of object represents PDF 44 to the user, and the statements within this item of the .sec file provide the default parameters for the user interface to PDF 44. However, PDF 44 does not include security and privilege information relating to workstation process, such information being stored on a local .sec file which is referred to by PDF 44.

The third item of the .sec file of the example, [Folder] TITLE=OS/2 System, identifies the desktop user interface representation of the object, and the statement CLASS=PRDirectory indicates that the object belongs to a class of program directories. Such a PRDirectory may be a subclass of a folder class, such as created by a LAN network system. This object represents a directory of programs to the user, specifically in this case a collection of OS/2 operating system programs. Any program activated from a particular folder inherits the privileges of the folder unless the program object itself overrides the inherent privileges. This item includes three identifications used by PDF 44 in manipulating this or related objects, namely OBJECTID (the identifier of the object itself), PARENTID (the identifier of the parent of the object), and SHADOWID (the pointer to the original object). The item also includes several display parameters, and several security/privilege indicators. This "OS/2 System" item includes several identifiers and indicators which are used in [Folder] class items. Icons are located inside the folders, and processes started by invoking the icons will have default access privileges according to the security/privilege statements of the originating folder, and all parent folders (folders which contain other folders).

The items identified by [Pad], [Program], [Datafile], and [Printer] all deal with discreet logical and/or physical devices. The [Pad] item refers to a facility which can initiate other operations or applications, or "launch" them, e.g., represented by a "LaunchPad" icon. The [Program] item refers to an executable file which when launched creates a process on workstation 24 and/or server 22, and may include API initialization strings and other related data. The [Datafile] item refers to a data file which when launched will activate an associated application program executable file. The [Printer] item (or other "Device" item) refers to a peripheral computer device such as a printer, modem, joystick, or similar input and/or output device.

The [Ses] item specifically relates to executables, directories, and/or devices of PDF 44 and Daemon 46 which interact with the Security Enabling Services kernel features of the OS/2 operating system. Alternatively, such an item could relate to separate parts of ADMIN 36 and/or Daemon 46 which initially lock and can later unlock the file system. ADMIN 36, PDF 44, and Daemon 46 are programmed to recognize specially designated objects as "trusted applications" and allow such trusted applications access to certain system level files. As implemented by the present invention, ADMIN 36, PDF 44, and Daemon 46 also allow "Device" items to be locked and/or monitored to maintain a log file of all operations occurring on or through the device.

The [Filter] item can be used by PDF 44 when creating or operating a desktop, or by Daemon 46 during an enumeration routine. The filtering process may be implemented on a class level, or alternatively object titles may be subject to such filtering. For example, a filter item may be used to remove window list entries from a desktop without a user prompt or acknowledgment. Another use of a filter may be to keep certain processes running during the creation or re-creation of a desktop (for example, to keep an external communication link active even though the local desktop is being rebuilt). A filter may also be used to require a password from PDF 44 or the user before invoking certain objects or classes of objects.

For objects which do not fall within one of the foregoing classes, the item designation [Object] provides a format for a user defined object, such as an abstract non-file system object. These types of abstract objects are of the .dll type, which are not necessarily with executable files rather are substantiated by the shell (often referred to as work place shell applications). Statements within this object shall be interpreted as if the statement occurred in one of the previously defined classes.

The present invention also provides two additional ways to secure the desktop, one being a hardware based restriction and the other a context based validation. The hardware based restriction is maintained by an additional file (RESTRICT.TXT) resident on the local computer which PDF 44 checks before creating desktop objects. In this manner, localcomputers can be configured so that certain sensitive applications cannot be created or invoked at certain physical locations, regardless of the privilege level of the user. The context based validation is a statement in a .sec file item, VPF=<path>|<filename>, which requires that the path or file specified be present and/or accessible by the user on the network before PDF 44 creates the specified desktop object.

PDF 44 thus creates a desktop which includes a graphic display of icons representing programs, files, network resources, and other related information. When the user launches a program or network resource and thereby creates a new process, PDF 44 displays a new window on the monitor of workstation 24 showing the activity of the new process. In the exemplary embodiment with a multi-tasking operating system, more than one process can appear on the desktop simultaneously. PDF 44 presents the most current window in the forefront, with the other windows accessible through a command. Also in the exemplary embodiment with an object oriented operating system, the communication and implementation of processes are achieved through the use of objects which contain the needed information for executing the process and interacting with other portions of the system. Each icon on the desktop has an associated object so that when PDF 44 observes the operator activating a particular icon, the corresponding object may be launched and a new display window may be created.

Before PDF 44 can operate, however, the objects which PDF 44 displays must be created. The user may first required to log in to network 20 before accessing workstation 24. Daemon 46 obtains the user's desktop profile from ADMIN 36, the desktop profile being a list of objects with appropriate restrictions and privileges, which may include keys or other authentication information. In addition, ADMIN 36 may also imposed other restrictions on that desktop profile transmitted to Daemon 46 based on the physical location or node of the user logging on to network 20. That desktop profile includes general information about the restrictions and boundaries applicable to PDF 44, as well as the objects available to PDF 44. Daemon 46 also obtains local attribute information, such as the presence or absence of local peripheral devices from workstation 24. PDF 44 may then transmit requests for creation of processes to Daemon 46, which determines if the requested process is permitted according to ADMIN 36's desktop profile for that user. This arrangement allows a user to log in at any workstation 24 of network 20 and have the same desktop displayed by PDF 44.

In the second embodiment of the invention, ADMIN 36 operates to lock out any user from accessing network resources. By enabling file system level blocking, no program or process can access a network file except through the enabled security procedure which requires a previously established access privilege to have existed for the user. The .sec file 50 may contain the information needed to "unlock" the security procedure and allow a user access to the network resource. In this way, any user attempt to access a network resource without using PDF 44 will fail. Only by using PDF 44, which is enabled by an appropriate key or other authentication information in the user's .sec file 50, can a user access network resources.

Figure 2:
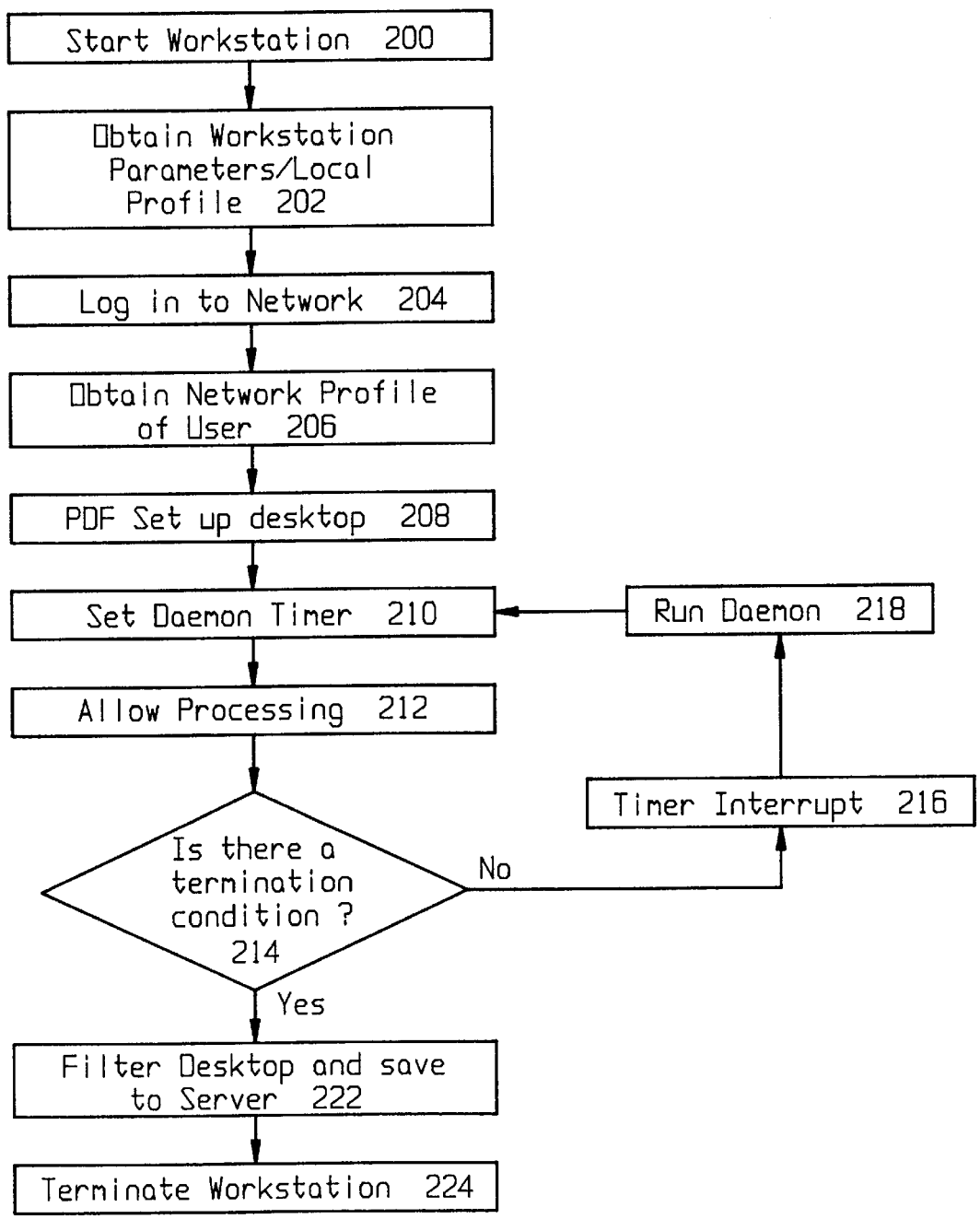
FIG. 2 is a flow chart diagram of the operation of the present invention.

The general sequence of operation is shown in the flow chart diagram of FIG. 2. Workstation 24 is powered on in step 200, which may include the use of appropriate access control software. Daemon 46 obtains the parameters associated with that particular workstation 24, typically by accessing a locally stored file or performing a diagnostic routine, in step 202. For example, in the exemplary embodiment, Daemon 46 first kills any old objects which are apparent on workstation 24. After this initial cleansing, Daemon 46 loads a binary file stored on local disk 42 which contains a set of all the possible objects for workstation 24, then hides those objects from display by PDF 44. Next Daemon 46 loads a second binary file of the active objects for workstation 24. Typically, this set of active objects includes a self-launching network log on procedure, typically involving typing in a username and password at step 204.

In accordance with the present invention, Daemon 46 may then obtain a user network profile from ADMIN Software 36 in step 206. In the second embodiment of the invention, ADMIN 36 initially blocks the user by denying all access privileges to network resources. Once Daemon 46 has the information regarding the local workstation and the user's network profile, typically by accessing .sec file 50 on server 22, PDF 44 may set up the user's desktop in step 208 by creating a list of objects representing the possible available resources, both on network 22 and workstation 24. In the second embodiment, PDF 44 may also obtain suitable access enabling information from .sec file 50 to allow the user to access security protected resources, such as a security key or other suitable authentication. At this point, workstation 24 is able to receive input from the user to initiate or interact with processes and accomplish the desired computing functions.

Daemon 46 continues to monitor the operations of workstation 24 so that the user does not modify the desktop created by PDF 44 in circumvention of the user's access and security provisions. In step 210, a timer is set so that Daemon 46 is activated periodically. In the exemplary embodiment of the invention, an interval of approximately three (3) seconds has been selected as a suitable period for activating Daemon 46 with the hardware and software being used with the inventional system. This interval is selected to check sufficiently frequently to catch violations before significant damage has occurred, without significantly reducing the efficiency and responsiveness of workstation 24. Also, this interval is adjustable by simply changing initialization parameters, without requiring reconfiguration of any other part of the system. However, one of ordinary skill understands that the periodic interval used to call Daemon 46 is dependent upon the hardware and software speed.

While the timer is running, step 212 allows the user to activate and manipulate workstation 24 as desired. During this period of operation, step 214 involves determining whether a termination condition has occurred, e.g., a user activated exit or a fatal system error, so that workstation 24 may be shut down. Should a termination condition be observed, step 222 (described in greater detail below) would then occur. In the typical case, however, processing would continue until timer interrupt step 216 occurs. The timer interrupt causes Daemon 46 to become the active program of the system, which allows Daemon 46 to check on the status of the other processes at workstation 24.

In the run Daemon 218 step, an enumeration process is conducted by the processor of workstation 24. Daemon 46 checks every process that is present in workstation 24 against the process information contained in its local copy of .sec file 50. Every process which is not found in the listing of .sec file 50 is processed further by Daemon 46, typically deleting and removing the unknown process from workstation 24. However, other operations are possible, and sometimes desired. For example, a message box may be displayed and the process may be modified according to the user's response to correspond to a known process. Another alternative may be to record the presence of the unknown process in a log for use by diagnostic software.

Known processes encountered by Daemon 46 during the enumeration routine may be dealt with in several ways. Typically, Daemon 46 checks for consistency between the process as noted by the desktop files by PDF 44 and the information from .sec file 50, making corrections when appropriate. Also, Daemon 46 checks the security protection of the process and the user for compliance with network security privileges. If an inconsistency is discovered, or a security violation, or another similar condition, then Daemon 46 may respond by: requesting a password from the user before allowing further access or processing; delete and remove the process from the desktop; record the presence of the process on a log file; rebuild the process using the original process and a user response to a message box; and/or another suitable response to the observed inconsistency. When Daemon 46 completes all of its operations on the processes of workstation 24, the timer is reset at step 210 and the foregoing steps are repeated.

Finally, when the user is ready to terminate operation of workstation 24, PDF 44 requests that the potentially modified desktop be saved in step 222. Daemon 46 receives this request, first filtering the newer desktop with the original user profile to make sure that the new desktop does not violate any of the user's profile information stored on server 22. After the new desktop has been so filtered, Daemon 46 saves the filtered new desktop by storing the representative file or files on server 22. Now, the operation of workstation 24 can be properly terminated at step 224.

The microfiche appendix contains an implementation of the present invention. The source code files in the appendix are associated with various directories. Following is a table showing the directories and the related source code description:

| Directory | Description |
| --- | --- |
| dskwps | This directory contains the source code of the engine which builds the desktop and creates the daemon. |
| dskcvl | This directory contains the source code of the object oriented data storage, low level code which loads information in the .sec files into an object representation. |

-continued

| Directory | Description |
| --- | --- |
| dskcmd | This directory contains the source code to the command line interface to the daemon. |
| dskdesk | This directory contains the source code for creating a "superclass" which inherits attributes of desktop items. |
| dskwpobj | This directory contains the source code for creating a "superclass" which inherits attributes of shell objects. |
| dskapi | This directory contains the source code for creating a third party vendor version of the present invention for use in conjuction with other software. |
| dsksift | This directory contains the source code for the shuffle or sifter routines of the daemon and its logic. |
| dskfs | This directory contains the source code for the file system daemon. |
| dsktimer | This directory contains the source code for an autologout routine which times out inactive users. |
| pdfadmin | This directory contains the source code for a test driver to use in conjuction with the dskapi routines. |
| dskses | This directory contains the source code for the hooks into the file system which allows for the file system lockout. |

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A computer network for providing user access to resources including one of local and network computer programs, local and network peripheral devices, and external communication devices, said network comprising:

a server;

a plurality of workstations coupled to said server, each said workstation including display means for providing a graphic user interface for a user; and communication means for transmitting messages between said server and said plurality of workstations;

said server including means for providing access to at least one resource for a user, said user operating one of said workstations, said network including a plurality of information records each with a user specific workstation configuration including specification of accessible resources for the user, said plurality of information records being located on at least one of said server and said plurality of workstations;

one of said workstations including desktop means for creating and displaying items referencing resources on said display means of said one workstation, said desktop means including means for retrieving one of said information records upon activation of said one workstation, said desktop means further including means for preventing a user from accessing any resources not specified by said retrieved information record, said retrieving means adapted to locate a first one of said information records on said one workstation to activate said preventing means to limit user access according to said first information record from said one workstation prior to said one workstation establishing contact with said network, and said retrieving means adapted to receive a second information record from said server to limit user access according to said second information record from said server.

2. The system of claim 1 wherein said server includes a security kernel for blocking user access to resources and only allowing user access to resources upon receipt of a corresponding key, said information records including one of said keys for allowing user access to resources via said security kernel, and said desktop means including means for unlocking user access to said resources by transmitting one of said keys to said security kernel.

3. The system of claim 1 wherein said desktop means includes means for initiating processes on said workstation and daemon means for monitoring processes initiated by said desktop means.

4. The system of claim 3 wherein said daemon means includes enumeration means for checking processes on the workstation against the information record.

5. The system of claim 1 wherein said desktop means includes hardware restriction means for imposing access restrictions based on information stored on one of said workstations.

6. The system of claim 1 wherein said desktop means includes validation means for requiring that a user have access to a validation resource before allowing access to a specified resource.

7. The system of claim 1 with an object oriented operating system, each object including a plurality of instructions and associated data, wherein said desktop means includes means for creating a list of objects representing the resources.

8. The system of claim 1 wherein said desktop means creates a menu of resources and includes means for storing said menu after a session with a user.

9. The system of claim 8 wherein said desktop means includes filtering means for filtering menu items according to criteria received from the server.

10. In a network of computers including a server and a workstation, a method of providing user access to resources, said method comprising the steps of:
    creating a plurality of information records with a user specific workstation configuration including specification of accessible resources for the user;
    retrieving one of the user specific information records using a computer program operating on the workstation; and
    providing on the workstation a desktop user interface providing user access as specified by the information record associated with the user and providing on the workstation a desktop security computer program that prevents a user from accessing any resources not specified by the information record associated with the user, and including a control program with the desktop user interface which locates a first one of said information records on the workstation to activate the desktop security computer program to limit user access according to the first information record from the workstation prior to the workstation establishing contact with the network, and the control program adapted to receive a second information record from the server to limit user access according to the second information record from the server.

11. The method of claim 10 further comprising the step of blocking user access to resources via a security kernel, wherein said information records include a key for only allowing user access to resources via said security kernel, and further comprising the step of allowing user access to resources upon receipt of a corresponding key from said desktop user interface.

12. The method of claim 10 further comprising the step of monitoring processes initiated by the desktop user interface.

13. The method of claim 12 wherein said monitoring step includes the step of checking processes on the workstation against the user specific information record received from the server.

14. The method of claim 10 further comprising the step of preventing unauthorized access to the network resources through said desktop.

15. The method of claim 10 further comprising the step of imposing access restrictions based on information stored on the workstation.

16. The method of claim 10 further comprising the step of requiring that a user have access to a validation resource before allowing access to a specified resource.

17. The method of claim 10 with the network using an object oriented operating system, each object including a plurality of instructions and associated data, further comprising the step of creating a list of objects representing the resources.

18. The method of claim 10 further including the step of storing said desktop after a session with a user.

19. The method of claim 10 wherein said providing step includes the step of filtering said desktop according to criteria received from the server.

20. A machine-readable program storage device for storing encoded instructions for a method of providing user access to resources in a network of computers including a server and a workstation, said method comprising the steps of:
    creating a plurality of information records each with a user specific workstation configuration including specification of accessible resources for the user;
    retrieving one of the user specific information records using a computer program operating on the workstation; and
    providing on the workstation a desktop user interface providing user access as specified by the information record associated with the user and providing on the workstation a desktop security computer program that prevents a user from accessing any resources not specified by the information record associated with the user, and including a control program with the desktop user interface which locates a first one of said information records on the workstation to activate the desktop security computer program to limit user access according to the first information record from the workstation prior to the workstation establishing contact with the network, and the control program adapted to receive a second information record from the server to limit user access according to the second information record from the server.

21. The machine-readable program storage device of claim 20 further comprising encoded instructions for the step of blocking user access to resources via a security kernel, wherein said information records include a key for only allowing user access to resources via said security kernel, and further comprising encoded instructions for the step of allowing user access to resources upon receipt of a corresponding key from said desktop user interface.

22. The machine-readable program storage device of claim 20 further comprising encoded instructions for the step of monitoring processes initiated by the desktop user interface.

23. The machine-readable program storage device of claim 22 further comprising encoded instructions for the step of checking processes on the workstation against information received from the server.

24. The machine-readable program storage device of claim 20 further comprising encoded instructions for the step of imposing access restrictions based on information stored on the workstation.

25. The machine-readable program storage device of claim 20 further comprising encoded instructions for the step of requiring that a user have access to a validation resource before allowing access to a specified resource.

26. The machine-readable program storage device of claim 20 further comprising encoded instructions for the step of ascertaining the configuration of the workstation.

27. The machine-readable program storage device of claim 20 with the network using an object oriented operating system, each object including a plurality of instructions and associated data, further comprising encoded instructions for the step of creating a list of objects representing the network resources.

28. The machine-readable program storage device of claim 20 further comprising encoded instructions for the step of storing said desktop after a session with a user.

29. The machine-readable program storage device of claim 20 further including encoded instructions for the step of filtering said desktop according to criteria received from the server.

30. In computer network for providing user access to resources including one of local and network computer programs, local and network peripheral devices, and external communication devices, with the network including a server, a plurality of workstations coupled through a massaging system to each other and the server, the workstations including displays for providing a graphic user interface for users, the network having a plurality of profile information records each with a user specific workstation configuration including specification of accessible resources for the user, the profile information records being located on at least one of the server and the workstations, a computer program for one of the workstations, said computer program including:

desktop means for creating and displaying items referencing resources on a display of a workstation;

profile means for receiving a profile information record; and security means for preventing a user from accessing any resources not specified by said retrieved profile information record, and said desktop means for locating a first one of said profile information records on the one workstation to activate said security means to limit user access according to said first profile information record from the workstation prior to the workstation establishing contact with the network, and said desktop means adapted to receive a second profile information record from the server to limit user access according to said second profile information record from the server.

31. The system of claim 30 wherein the server includes a security kernel for blocking user access to resources and only allowing user access to resources upon receipt of a corresponding key, the profile information records including one of the keys for allowing user access to resources via the security kernel, and said desktop means including means for unlocking user access to the resources by transmitting one of the keys to the security kernel.

32. The system of claim 30 wherein said desktop means includes means for initiating processes on said workstation and daemon means for monitoring processes initiated by said desktop means.

33. The system of claim 32 wherein said daemon means includes enumeration means for checking processes on the workstation against the profile information record.

34. The system of claim 30 wherein said desktop means includes hardware restriction means for imposing access restrictions based on information stored on one of the workstations.

35. The system of claim 30 wherein said desktop means includes validation means for requiring that a user have access to a validation resource before allowing access to a specified resource.

36. The system of claim 30 with an object oriented operating system, each object including a plurality of instructions and associated data, wherein said desktop means includes means for creating a list of objects representing the resources.

37. The system of claim 30 wherein said desktop means creates a menu of resources and includes means for storing said menu after a session with a user.

38. The system of claim 37 wherein said desktop means includes filtering means for filtering menu items according to criteria from the profile information record.

\* \* \* \* \*

UNITED STATES PATENT AND TRADEMARK OFFICE
CERTIFICATE OF CORRECTION

PATENT : 6,061,795
DATED : May 09, 2000
INVENTOR(S): Charles E. Dircks, et al.

It is certified that error appears in the above-identified patent and that said Letters Patent is hereby corrected as shown below:

In the Abstract

Line 19, delete "networkpreventing" and substitute therefor -- network, preventing--

In the Claims

Claim 10, column 17, line 39 after " records" insert --each--

Claim 30, column 19, line 29 delete "massaging" and substitute therefor --messaging--

Claim 30, column 19, line 40 delete "receiving" and substitute therefor --retrieving--

Signed and Sealed this

Twentieth Day of March, 2001

Attest:

NICHOLAS P. GODICI

*Attesting Officer*    *Acting Director of the United States Patent and Trademark Office*